Aug. 4, 1925.
L. JAENICHEN
1,548,321
LUBRICANT RETAINER FOR SCALE BEARINGS
Filed April 14, 1924     2 Sheets-Sheet 1
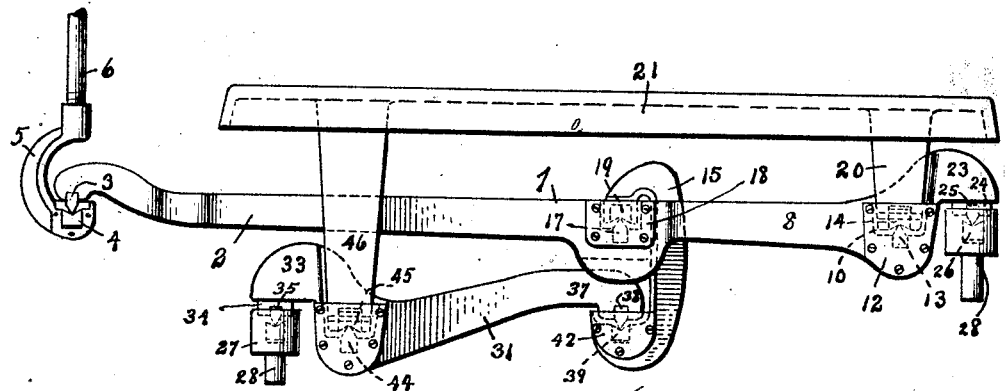
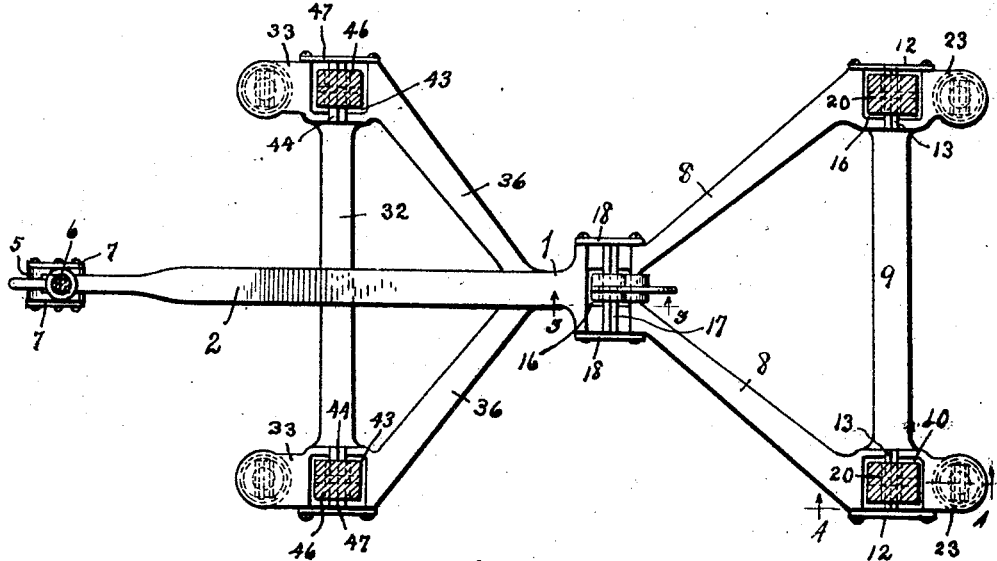
INVENTOR.
Louis Jaenichen,
BY Edward N. Pagelsen
ATTORNEY.

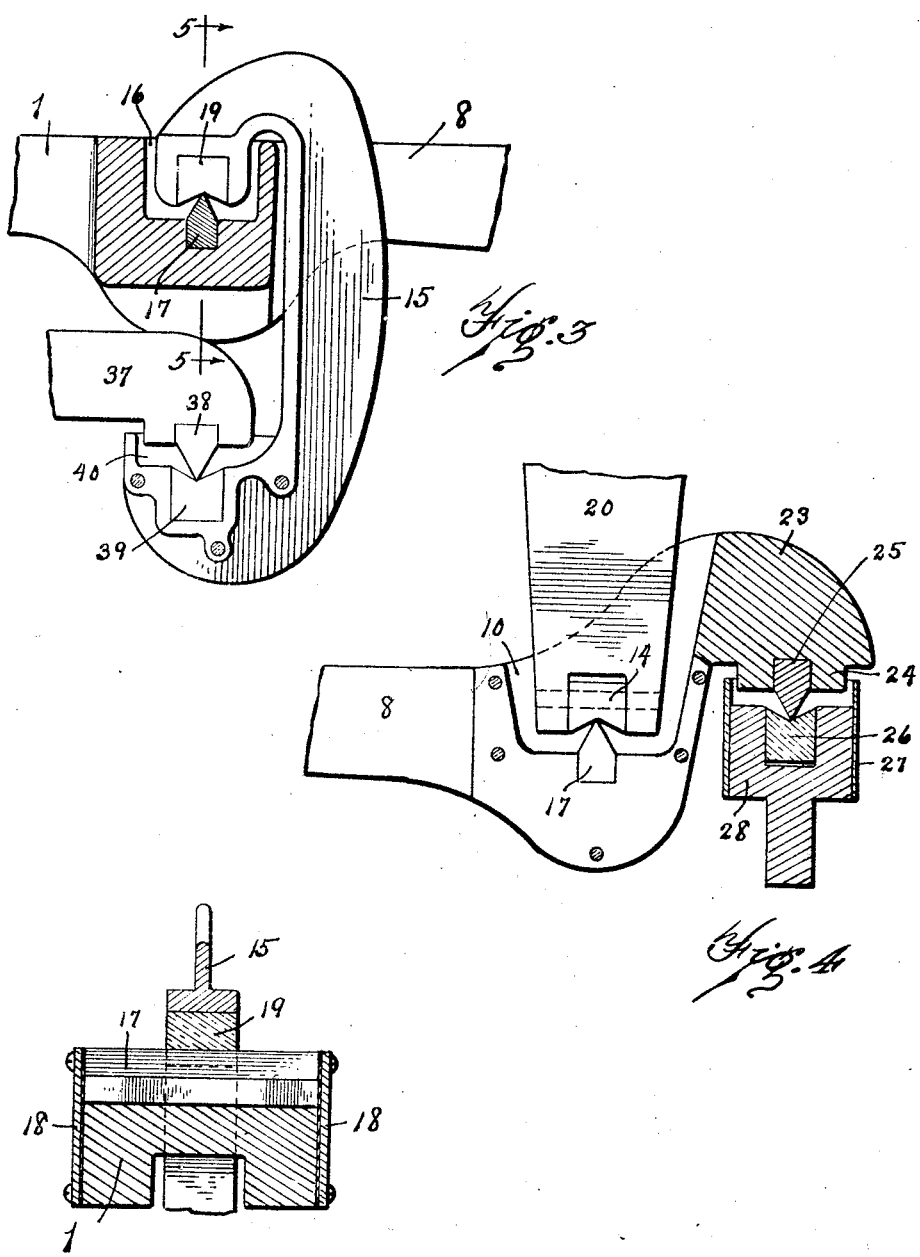

Patented Aug. 4, 1925.

1,548,321

UNITED STATES PATENT OFFICE.

LOUIS JAENICHEN, OF DETROIT, MICHIGAN, ASSIGNOR TO THE STANDARD COMPUTING SCALE COMPANY, OF DETROIT, MICHIGAN, A CORPORATION OF MICHIGAN.

LUBRICANT RETAINER FOR SCALE BEARINGS.

Application filed April 14, 1924. Serial No. 706,303.

*To all whom it may concern:*

Be it known that I, LOUIS JAENICHEN, a citizen of the United States, and residing at Detroit, in the county of Wayne and State of Michigan, have invented a new and Improved Lubricant Retainer for Scale Bearings, of which the following is a specification.

This invention relates to the lever systems of weighing scales, particularly to the bearings therefor, and its object is to provide a scale construction in which sufficient lubrication for the bearings is insured.

This invention consists in a lever system for weighing scales in which the bearings are arranged below the rims of lubricant retainers so that these bearings may be kept oiled and the wear of the bearings may be kept down to a minimum.

In the accompanying drawings, Fig. 1 is a side elevation and Fig. 2 is a plan of a lever system for scales embodying the present invention. Figs. 3 and 4 are sections on the lines 3—3 and 4—4 of Fig. 2 respectively. Fig. 5 is a section on the line 5—5 of Fig. 3.

Similar reference characters refer to like parts throughout the several views.

No scale frame or base is shown in the drawings as the present invention may be employed in connection with lever scales of any desired type. In the present construction a main lever 1 has a central arm 2 carrying a knife edge pivot 3 which rests on a bearing block 4 supported by a hook 5 at the lower end of the rod 6 which connects to the load resisting springs, to the steelyard or to the weight indicator, according to the type of the scale. Two plates 7 are secured to the sides of the lower end of this hook to complete a cup to receive some substantially non-volatile lubricant in which the bearing is submerged.

The lever 1 may have two diagonal arms 8 and a cross bar 9. A recess 16 is formed at the juncture of the arms 2 and 8 and the ends of this recess are closed by the plates 18. A knife edge pivot 17 lies in a groove in the bottom of this recess and supports the bearing block 19 carried by the C-shaped link 15, (see Fig. 3). The lever 1 may be also formed with recesses 10 at the juncture of the arms 8 and the cross bar 9 and the knife edge pivots 17 are mounted in proper grooves in the bottoms of these recesses. Plates 12 close the open ends of these recesses. These knife edge pivots 13 support the bearing blocks 14 at the lower ends of two legs 20 of the platform 21. Short arms 23 extend from the cross bar 9 and the bosses 24 on the lower sides of these arms carry knife edge pivots 25 which rest on the bearing blocks 26 mounted in cups formed of the shells 27 and the bodies 28. These bodies are supported in any desired manner by the scale frame or platform. I prefer these bodies 28 and the shells 27 to be cylindrical because of ease of manufacture.

The secondary lever 31 has a cross bar 32 from which extend the arms 33 whose bosses 34 carry knife edge pivots 35. The bodies 28 with their shells 27 and bearing blocks 26 are the same as above described and constitute the supporting bearings of the secondary lever. The diagonal arms 36 extend from the cross bar 32 to the central arm 37 which carries a knife edge pivot 38 resting on the bearing block 39 in a recess 40 at the lower end of the link 15. This recess may have its ends closed by the plates 42 to constitute a lubricant receptacle.

The secondary lever is also shown to have recesses 43 at the ends of its cross bar 32 and knife edge pivots 44 mounted in the bottoms of these recesses in the manner indicated in Fig. 4 to receive the bearings 45 at the lower ends of the arms 46 of the platform 21. The open ends of these recesses are closed by means of plates 47.

A lubricant receptacle is thus provided at each bearing, and each receptacle is so deep that the contact line of the knife edge pivot and its bearings may always be submerged. As these bearing blocks are usually of steel, such lubrication is necessary in order to prevent rusting and insure long life with permanent accuracy. It will be understood, however, that the relative positions of knife edge pivots and bearing blocks may be reversed if desired; that is, where the drawings show the pivot resting on the block a block resting on a pivot may be employed and vice versa.

The several examples of lubricating recesses in the lever system shown in the drawings may be varied by those skilled in the art without departing from the spirit of my invention as set forth in the following claims.

I claim:—

1. In a scale, the combination of main and secondary levers, knife edges at the outer ends thereof, supporting members comprising cylindrical bodies having transverse grooves, bearing blocks mounted in said grooves to support said pivots, and cylindrical shells mounted on said bodies and extending up above the lines of contact of the pivots and bearing blocks so as to retain sufficient lubricant to submerge said lines of contact.

2. In a scale, the combination of main and secondary levers and supporting bearings for the outer ends thereof, said main lever being formed with a transverse recess, a knife edge pivot mounted in a groove in the bottom of the recess, the secondary lever being formed with a transverse groove at the lower side of its inner end, a knife edge pivot mounted in said groove, and a C-shaped link having a bearing block at its upper end resting on the knife edge pivot in the recess in the main lever and being formed with a recess in its lower end, and a bearing block mounted in said last named recess and supporting the knife edge pivot of the scondary lever, said recesses being so deep that their rims are above the lines of contact of said pivots and bearing blocks.

LOUIS JAENICHEN.